(12) United States Patent
Määttänen et al.

(10) Patent No.: US 11,997,589 B2
(45) Date of Patent: May 28, 2024

(54) IAB INITIAL ACCESS

(71) Applicant: Telefonaktiebolaget LM Ericsson (publ), Stockholm (SE)

(72) Inventors: Helka-Liina Määttänen, Helsinki (FI); Erik Dahlman, Stockholm (SE); Lei Bao, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 17/424,707

(22) PCT Filed: Dec. 19, 2019

(86) PCT No.: PCT/SE2019/051315
§ 371 (c)(1),
(2) Date: Jul. 21, 2021

(87) PCT Pub. No.: WO2020/153886
PCT Pub. Date: Jul. 30, 2020

(65) Prior Publication Data
US 2022/0015020 A1     Jan. 13, 2022

Related U.S. Application Data

(60) Provisional application No. 62/794,866, filed on Jan. 21, 2019.

(51) Int. Cl.
*H04W 48/16* (2009.01)
(52) U.S. Cl.
CPC .................................. *H04W 48/16* (2013.01)
(58) Field of Classification Search
CPC .................................................... H04W 48/16
(Continued)

(56) References Cited

U.S. PATENT DOCUMENTS

2019/0207662 A1* 7/2019 Zhou ..................... H04W 24/08
2019/0253986 A1* 8/2019 Jeon ........................ H04L 5/0048

FOREIGN PATENT DOCUMENTS

EP      3836592 A1    6/2021
WO   2019159107 A1    8/2019

OTHER PUBLICATIONS

Author Unknown, "Technical Specification Group Radio Access Network; NR; Physical channels and modulation (Release 15)," Technical Specification 38.211, Version 15.4.0, 3GPP Organizational Partners, Dec. 2018, 96 pages.
(Continued)

*Primary Examiner* — Ted M Wang
(74) *Attorney, Agent, or Firm* — Withrow & Terranova, PLLC

(57) ABSTRACT

Embodiments of a method performed by an Integrated Access and Backhaul (IAB) node to perform initial cell access in a cellular communications network and corresponding embodiments of an IAB node are disclosed. In some embodiments, the method performed by the IAB node comprises detecting a Synchronization Signal/Physical Broadcast Channel Block (SSB) of a cell and reading system information comprising a value of a parameter from the SSB. The method further comprises determining that the value of the parameter is a predefined value that serves as an indication to IAB nodes that additional system information is present on the cell and searching for the additional system information in accordance with the value of the parameter. In some embodiments, the predefined value of the parameter serves as an indication to one or more other types of nodes that additional system information is not present on the cell.

16 Claims, 6 Drawing Sheets

(58) Field of Classification Search
USPC .......................................................... 455/434
See application file for complete search history.

(56) References Cited

OTHER PUBLICATIONS

Author Unknown, "Technical Specification Group Radio Access Network; NR; Multiplexing and channel coding (Release 15)," Technical Specification 38.212, Version 15.4.0, 3GPP Organizational Partners, Dec. 2018, 100 pages.
Author Unknown, "Technical Specification Group Radio Access Network; NR; Physical layer procedures for control (Release 15)," Technical Specification 38.213, Version 15.4.0, 3GPP Organizational Partners, Dec. 2018, 104 pages.
Author Unknown, "Technical Specification Group Radio Access Network; NR; User Equipment (UE) procedures in Idle mode and RRC Inactive state (Release 15)," Technical Specification 38.304, Version 15.2.0, 3GPP Organizational Partners, Dec. 2018, 28 pages.
Author Unknown, "Technical Specification Group Radio Access Network; NR; Radio Resource Control (RRC) protocol specification (Release 15)," Technical Specification 38.331, Version 15.4.0, 3GPP Organizational Partners, Dec. 2018, 474 pages.
Ericsson, "R1-1900999: Enhancements to initial access procedure," Third Generation Partnership Project (3GPP), TSG-RAN WG1 Meeting AH#1901, Jan. 21-25, 2019, 12 pages, Taipei, Taiwan.
Huawei, et al., "R1-1900031: Initial access procedure for IAB," Third Generation Partnership Project (3GPP), TSG RAN WG1 Ad-Hoc Meeting 1901, Jan. 21-25, 2019, 4 pages, Taipei.
Nokia, et al., "R1-1810677: Discovery and measurements for IAB," Third Generation Partnership Project (3GPP), TSG RAN WG1 Meeting #94-bis, Oct. 8-12, 2018, 7 pages, Chengdu, P.R. China.
International Search Report and Written Opinion for International Patent Application No. PCT/SE2019/051315, dated Feb. 7, 2020, 17 pages.
Examination Report for European Patent Application No. 19827864.0, dated Jul. 17, 2023, 6 pages.

* cited by examiner

IAB INITIAL ACCESS

RELATED APPLICATIONS

This application is a 35 U.S.C. § 371 national phase filing of International Application No. PCT/SE2019/051315, filed Dec. 19, 2019, which claims the benefit of provisional patent application Ser. No. 62/794,866, filed Jan. 21, 2019, the disclosures of which are hereby incorporated herein by reference in their entireties.

TECHNICAL FIELD

The present disclosure relates to initial cell access in a cellular communications network and to Integrated Access and Backhaul (IAB) nodes.

BACKGROUND

Integrated Access and Backhaul (IAB) is to be introduced in Third Generation Partnership Project (3GPP) New Radio (NR) Release 16 to provide flexible and dense deployment of NR cells without densifying the transport network proportionately. FIG. 1 gives an example of an IAB deployment in which multiple IAB nodes are wirelessly connected. An IAB donor node provides an interface to the core network for the User Equipment devices (UEs) and provides wireless backhauling functionality to IAB nodes. An IAB node is a Radio Access Network (RAN) node that supports wireless access to UEs and wirelessly backhauls the access traffic. Each IAB node, as well as the IAB donor node, creates one or multiple cells to which UEs, as well as other IAB nodes, can connect.

In general, within NR, the transmission from the cell site of so-called Synchronization Signal (SS)/Physical Broadcast Channel (PBCH) Blocks (SSBs) are used by UEs to initially find a cell to which to connect to and discover and measure on neighbor cells. An SSB is transmitted over four consecutive Orthogonal Frequency Division Multiplexing (OFDM) symbols and consists of three parts:
1. a Primary Synchronization Signal (PSS) from which a UE can synchronize in time and frequency to the cell transmitting the SSB,
2. a Secondary Synchronization Signal (SSS) from which a UE can acquire the Physical Cell Identity (PCI) of the cell transmitting the SSB, and
3. a PBCH which includes a very limited amount of system information that a UE needs before it can connect to the cell.

The main part of the cell system information included in the PBCH is included in what is known as the Master Information Block (MIB). The remaining part of the cell system information is transmitted in so-called System Information Blocks (SIBs) that can either be broadcast or transmitted on demand. One part of the cell system information, namely the remaining cell system information needed before a UE can access the corresponding cell, is transmitted in System Information Block 1 (SIB1), which is always broadcast. SIB1 is transmitted in the same way as normal scheduled downlink data transmissions in NR, with the SIB1 information itself transmitted on the Physical Downlink Shared Channel (PDSCH) physical channel and scheduling information, needed by the UE to find and decode the PDSCH, transmitted on the Physical Downlink Control Channel (PDCCH) physical channel within a so-called Control Resource Set (CORESET). As will be seen below, information needed by the UE to derive the CORESET in which to find a PDCCH carrying scheduling information related to SIB1 transmission is carried within the PBCH.

With the introduction of IAB in NR Release 16, it is expected that IAB nodes will also use SSBs transmitted from IAB donor nodes or other IAB nodes to find cells to access and for neighbor cell discovery/measurements.

Two types of SSBs can be transmitted in NR, namely:
1. an SSB that has an associated SIB1 being transmitted, referred to as a Cell-Defining (CD) SSB, and
2. an SSB that does not have an associated SIB1 being transmitted, referred to as a non-CD SSB.

SSBs (CD-SSBs as well as non-CD-SSBs) can be transmitted on or outside of the so-called synchronization raster. Transmitting the SSB on the synchronization raster means that the center frequency of the SSB is within a limited set of frequency domain positions (the "synchronization raster") defined in the 3GPP NR specifications. Only SSBs on the synchronization raster can be found by UEs doing initial access. If the SSB also has an associated SIB1, a Release 15 UE can then perform initial access using this SSB. An example is illustrated in FIG. 2.

The content of the MIB, which is transmitted on PBCH, is specified in 3GPP Technical Specification (TS) 38.331 V15.4.0. An extract from TS 38.331 V15.4.0 is included below. The relevant aspects are in bold text and underlined.

----------------Start Extract from TS 38.331------------------
– MIB

The MIB includes the system information transmitted on BCH.
Signalling radio bearer: N/A
RLC-SAP: TM
Logical channel: BCCH
Direction: Network to UE

MIB

```
-- ASN1START
-- TAG-MIB-START
MIB ::=                               SEQUENCE{
    systemFrameNumber                     BIT STRING (SIZE (6)),
    subCarrierSpacingCommon               ENUMERATED {scs15or60,
scs30or120},
    ssb-SubcarrierOffset                  INTEGER (0..15),
    dmrs-TypeA-Position                   ENUMERATED {pos2, pos3},
    pdcch-ConfigSIB1                      PDCCH-ConfigSIB1,
    cellBarred                            ENUMERATED {barred,
notBarred},
    intraFreqReselection                  ENUMERATED {allowed,
notAllowed},
    spare                                 BIT STRING (SIZE (1))
}
```

-- TAG-MIB-STOP
-- ASN1STOP

MIB field descriptions cellBarred
Barred means the cell is barred, as defined in TS 38.304 [20].

dmrs-TypeA-Position
Position of (first) DM-RS for downlink (see TS 38.211 [16], clause 7.4.1.1.2) and uplink
(see TS 38.211 [16], clause 6.4.1.1.3).

intraFreqReselection
Controls cell selection/reselection to intra-frequency cells when the highest ranked cell
is barred, or treated as barred by the UE, as specified in TS 38.304 [20}.

pdcch-ConfiqSIB1
See TS 38.213 [13]. Determines a common ControlResourceSet (CORESET) a common search space and necessary PDCCH parameters. If the field ssb-SubcarrierOffset indicates that SIB1 is not present, the field pdcch-ConfiqSIB1 indicate the frequency positions where the UE may find SS/PBCH block with SIB1 or the frequency range where the network does not provide SS/PBCH block with SIB1 (see TS 38.213 [13] clause 13).

ssb-SubcarrierOffset
Corresponds to $k_{SSB}$ (see TS 38.213 [13]), which is the frequency domain offset between SSB and the overall resource block grid in number of subcarriers. (See TS 38.211 [16], clause 7.4.3.1).
The value range of this field may be extended by an additional most significant bit encoded within PBCH as specified in TS 38.213 [13].
This field may indicate that this cell does not provide SIB1 and that there is hence no CORESET#0 configured in MIB (see TS 38.213 [13] clause 13). In this case, the field pdcch-ConfiqSIB1 may indicate the frequency positions where the UE may (not) find a SS/PBCH with a control resource set and search space for SIB1 (see TS 38.213 [13], clause 13).

subCarrierSpacingCommon
Subcarrier spacing for SIB1, Msg.2/4 for initial access, paging and broadcast SI-
messages. If the UE acquires this MIB on a carrier frequency <6GHz, the value
scs15or60 corresponds to 15 Khz and the value scs30or120 corresponds to 30 kHz. If
the UE acquires this MIB on a carrier frequency >6GHz, the value scs15or60
corresponds to 60 Khz and the value scs30or120 corresponds to 120 kHz.

systemFrameNumber
The 6 most significant bit (MSB) of the 10-bit System Frame Number. The 4 LSB of the
SFN are conveyed in the PBCH transport block as part of channel coding (i.e. outside
the MIB encoding), as defined in clause 7.1 in TS 38.212 [17].
-----------------End Extract from TS 38.331 ------------------

Two parameters in the MIB (see above) provide information that assists UEs to find the PDCCH associated with SIB1 transmissions. In particular, the parameter ssb-SubCarrierOffset provides information about the frequency offset between the detected SSB (the SSB within which the MIB is transmitted) and the so-called Common Resource Block (CRB) grid. The parameter pdcch-ConfigSIB1 provides further details of the PDCCH transmission. It can be seen that:

ssb-SubCarrierOffset can take 16 different values (0-15); values of ssb-SubCarrierOffset from the set {0, 1, 2, ..., 11} indicate the frequency offset between the detected SSB and CRB grid (as a resource block consists of 12 subcarriers, the frequency offset of up to 11 subcarriers); and values of ssb-SubCarrierOffset from the set {12, 13, 14, 15} indicate to a UE that there is no SIB1 associated with the SSB.

It should be pointed out that for the so-called Frequency Range 1 (FR1)—that is, for carrier frequencies below 6 gigahertz (GHz)—ssb-SubCarrierOffset is extended with one additional bit transmitted on the PBCH but outside of the MIB. This leads to a total of 32 different values (0-31) out of which values from the set {0, 1, 2, ..., 23} indicate the frequency offset between the detected SSB and the CRB grid and values from the set {24, ..., 31} indicate that there is no associated SIB1.

There currently exist certain challenge(s). Although the existing solution described above which is designed for UEs searching for and measuring on cells works well in that situation, there are problems when reusing this solution for IAB nodes. Thus, there is a need for system and methods for initial access for IAB nodes.

SUMMARY

Systems and methods are disclosed herein for initial cell access for an Integrated Access and Backhaul (IAB) node. Embodiments of a method performed by an IAB node to perform initial cell access in a cellular communications network are disclosed. In some embodiments, the method performed by the IAB node comprises detecting a Synchronization Signal (SS)/Physical Broadcast Channel (PBCH) Block (SSB) of a cell and reading, from the SSB, system information comprising a value of a parameter. The method further comprises determining that the value of the parameter is a predefined value that serves as an indication to IAB nodes that additional system information is present on the cell and searching for the additional system information in accordance with the value of the parameter. In some embodiments, the predefined value of the parameter serves as an indication to one or more other types of nodes that additional system information is not present on the cell. In this manner, an IAB is enabled to perform initial access to the cell.

In some embodiments, the value of the predefined value also serves, to IAB nodes, as an indication of a frequency domain offset between the detected SSB and a defined resource block grid of the cell.

In some embodiments, the predefined value of the parameter serves as an indication to User Equipments (UEs) or one or more certain types of UEs that additional system information is not present on the cell. Further, in some embodiments, the parameter has a predefined set of possible values. Values in a first subset of the predefined set of possible values of the parameter serve, to the one or more certain types of UEs, as indications of different frequency offsets between the detected SSB and the defined resource block grid of the cell. Values in a second subset of the predefined set of possible values of the parameter serve, to the one or more certain types of UEs, as indications that additional system information is not present on the cell, the first subset and the second subset being disjoint subsets of the predefined set of possible values. The predefined value of the parameter that serves as an indication to IAB nodes that the additional system information present on the cell is one of the values in the second subset of the predefined set of possible values of the parameter.

In some embodiments, the predefined value of the parameter is mapped to a respective one of the values in the first subset of the predefined set of possible values of the parameter such that the predefined value of the parameter also serves, to IAB nodes, as an indication that a frequency domain offset between the detected SSB and a defined resource block grid is a frequency offset indicated by the respective one of the values in the first subset of the predefined set of possible values of the parameter to which the predefined value is mapped. Further, in some embodiments, all of the values in the second subset of the predefined set of possible values of the parameter serve as indications, to IAB nodes, that the additional system information is present on the cell and each value in the second subset of the predefined set of possible values of the parameter is mapped to a different value in the first subset of the predefined set of possible values of the parameter. In some other embodiments, one or more, but not all, of the values in the second subset of the predefined set of possible values of the parameter serve as indications, to IAB nodes, that the additional system information is present on the cell and each value of the one or more of the values in the second subset of the predefined set of possible values of the parameter that serve as indications, to IAB nodes, that the additional system information is present on the cell is mapped to a different value in the first subset of the predefined set of possible values of the parameter.

In some embodiments, one or more, but not all, of the values in the second subset of the predefined set of possible values of the parameter serve as indications, to IAB nodes, that the additional system information is present on the cell.

In some embodiments, one of the values in the second subset of the predefined set of possible values of the parameter serves as an indication, to IAB nodes, that the additional system information is not present on the cell.

In some embodiments, all of the values in the second subset of the predefined set of possible values of the parameter serve as indications, to IAB nodes, that the additional system information is present on the cell.

In some embodiments, the cellular communications network is a Third Generation Partnership Project (3GPP) New Radio (NR) network, and the parameter is ssb-SubCarrierOffset.

In some embodiments, the cellular communications network is a 3GPP NR network, the parameter is ssb-SubCarrierOffset, the first subset of the predefined set of possible values for the parameter is {0, 1, 2, . . . , 11}, and the second subset of the predefined set of possible values for the parameter is {11, 12, 13, 14, 15}.

In some embodiments, the cellular communications network is a 3GPP NR network, the parameter is ssb-SubCarrierOffset, the first subset of the predefined set of possible values for the parameter is {0, 1, 2, . . . , 23}, and the second subset of the predefined set of possible values for the parameter is {24, 25, 26, . . . , 31}.

In some embodiments, a second parameter, subCarrierSpacingCommon, is used together with the second subset of the predefined set of possible values for the parameter to indicate, to IAB nodes, a subcarrier offset to be used to find the additional system information.

In some embodiments, the system information is a Master Information Block (MIB), and one or more reserved bits in the MIB are used to indicate that the additional system information is targeted only to IAB nodes.

In some embodiments, the one or more certain types of UEs comprise Release 15 UEs.

In some embodiments, a synchronization raster utilized by the IAB node is separate from or complementary to a synchronization raster utilized by the one or more certain types of UEs.

In some embodiments, the system information is a MIB, and the additional system information is an IAB secondary information block within only information needed by the IAB node for initial access.

In some embodiments, the system information is a MIB, and the additional system information is an existing secondary information block that is extended to carry additional IAB-specific system information.

Embodiments of an IAB node for performing initial cell access in a cellular communications network are also disclosed. In some embodiments, the IAB node is adapted to detect a SSB of a cell and read, from the SSB, system information comprising a value of a parameter. The IAB node is further adapted to determine that the value of the parameter is a predefined value that serves as an indication to IAB nodes that additional system information is present on the cell and search for the additional system information in accordance with the value of the parameter.

In some embodiments, the IAB node comprises one or more transmitters, one or more receivers, and processing circuitry associated with the one or more transmitters and the one or more receivers. The processing circuitry is configured to cause the IAB node to detect the SSB of the cell, read the system information comprising the value of the parameter from the SSB, determine that the value of the parameter is the predefined value that serves as an indication to IAB nodes that additional system information is present on the cell, and search for the additional system information in accordance with the value of the parameter.

In some other embodiments, a method performed by an IAB node to perform initial cell access in a cellular communications network comprises detecting an SSB of a cell in accordance with an SSB format that can be decoded by the IAB node but not one or more other types of nodes and reading system information from the detected SSB. In some embodiments, the one or more other types of nodes comprise one or more types of UEs. In some embodiments, the one or more types of UEs comprise Release 15 UEs. In some embodiments, the system information comprises a MIB and a System Information Block 1 (SIB1).

In other embodiments, an IAB node for performing initial cell access in a cellular communications network is adapted to detect an SSB of a cell in accordance with an SSB format that can be decoded by the IAB node but not one or more other types of nodes and read system information from the detected SSB. In some embodiments, the IAB node comprises one or more transmitters, one or more receivers, and processing circuitry associated with the one or more transmitters and the one or more receivers. The processing circuitry is configured to cause the IAB node to detect the SSB of the cell in accordance with the SSB format that can be decoded by the IAB node but not one or more other types of nodes and read the system information from the detected SSB.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
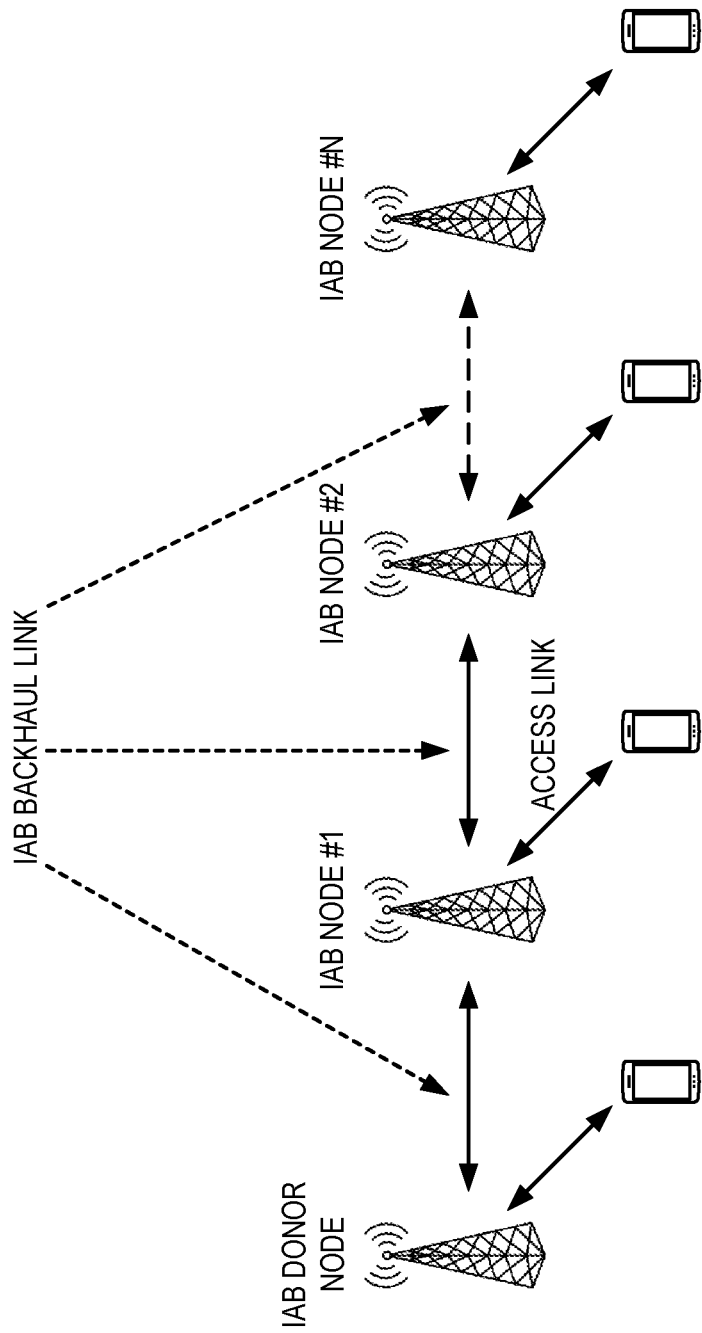
FIG. 1 gives an example of an Integrated Access and Backhaul (IAB) deployment in which multiple IAB nodes are wirelessly connected.
Figure 2:
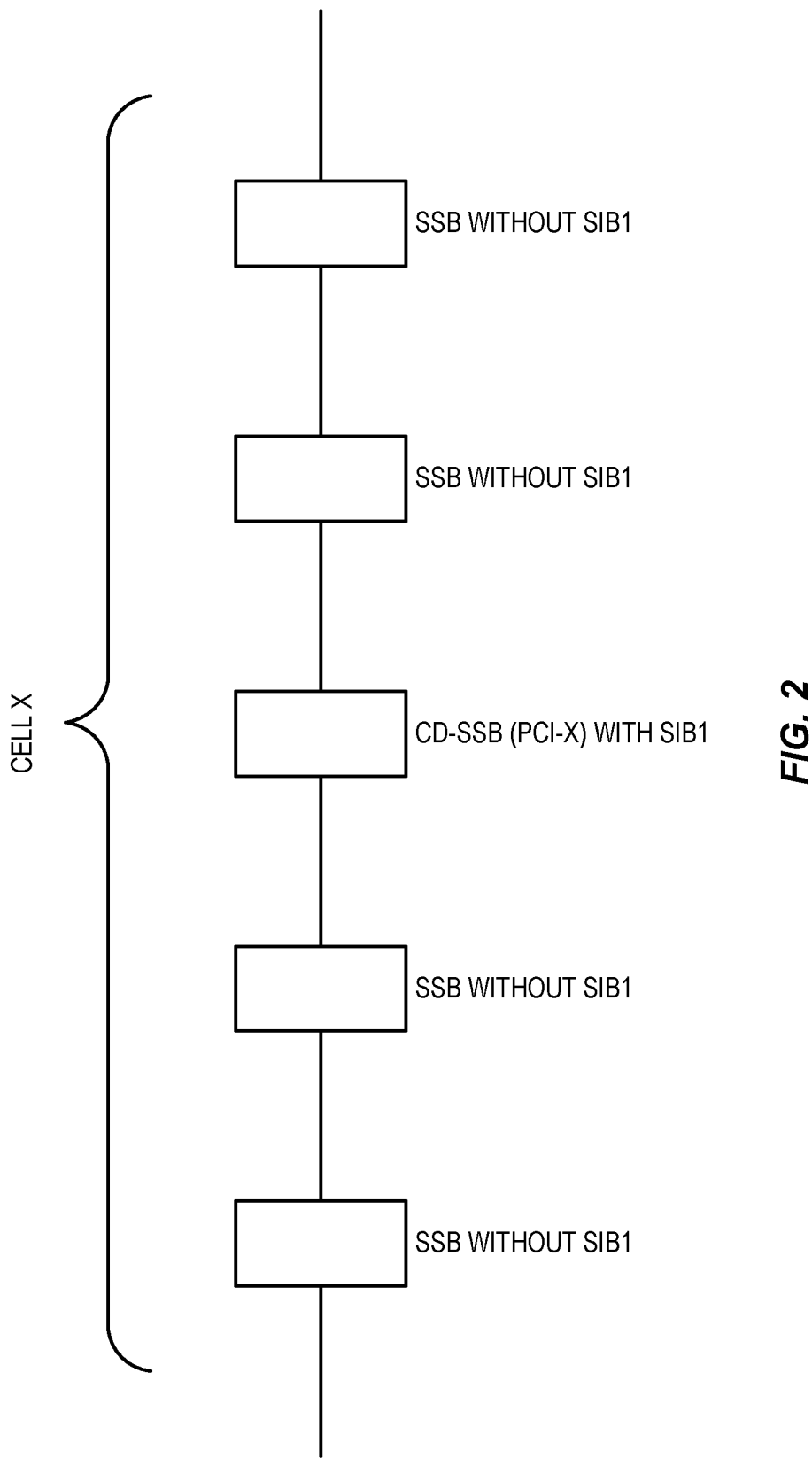
FIG. 2 illustrates an example of Synchronization Signal (SS)/Physical Broadcast Channel (PBCH) Block (SSBs) with and without associated System Information Block 1 (SIB1)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" or "RAN node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (e.g., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

IAB Node: As used herein, an Integrated Access and Backhaul (IAB) node is a RAN node that supports wireless access to UEs and wirelessly backhauls the access traffic.

IAB Donor Node: As used herein, an IAB donor node is a node that provides an interface between UEs and a core network (via corresponding IAB node(s)) and provides wireless backhauling functionality to an IAB node(s). Note that an IAB donor node may also be an IAB node. In other words, a single RAN node can operate as both an IAB node and an IAB donor node.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with respect to IAB nodes in a cellular communications system such as, e.g., a Fifth Generation System (5GS) using NR. Although the existing solution for initial access designed for UEs searching for and measuring on cells works well in that situation, there are problems when reusing this solution for IAB nodes.

First, in case of a Non-Stand-Alone (NSA) deployment of a 5GS where UEs are simultaneously connected to the network via an NR carrier and a Fourth Generation (4G)/LTE carrier, UEs do not perform initial access on the NR carrier. However, it is assumed that, in some NSA deployments, an JAB node should still be able to perform initial access on the NR carrier. One reason for allowing an JAB node initial access on the NR carrier in NSA deployments and, more generally, allow for stand-alone operation from an JAB node point of view in NSA deployments would be to avoid the need to implement an LTE modem in the JAB node. In this scenario, the Synchronization Signal (SS)/

Physical Broadcast Channel (PBCH) Block (SSB)-based solutions for JAB initial access in the current JAB system information cannot be used. There is a need to allow the JAB node to perform initial access via SSB that does not transmit SIB to Release 15 UEs; that is, an SSB that is not a Release 15 Cell-Defining (CD) SSB.

Furthermore, an JAB node creates cells of its own and thus needs to transmit corresponding SSBs. At the same time, an JAB node needs to search for and measure on SSB transmissions from other JAB nodes and JAB donor nodes in order for the network to be able to determine what node the JAB node is to connect to. However, a node cannot transmit and measure SSB at the same time.

Finally, a UE doing initial access can expect that SSBs are transmitted with a periodicity of at most 20 milliseconds (ms). For carriers on which no UEs, but only JAB nodes, make initial access, there may be a desire to make this maximum SSB periodicity longer.

Certain aspects of the present disclosure and their embodiments may provide solutions to the aforementioned or other challenges. Systems and methods are disclosed herein that enable an JAB node initial access while having certain types of UEs (e.g., Release 15 UEs) operating in the same network, served by normal gNBs in Stand-Alone (SA) or NSA manner or by the JAB nodes using certain procedures and assumptions (e.g., Release 15 procedures and assumptions). In this regard, several example embodiments are described below for enabling an JAB node initial access while having Release 15 UEs operating in the same network, served by normal gNBs in SA or NSA manner or by the JAB nodes using Release 15 procedures and assumptions. Note that these embodiments are only examples and the embodiments disclosed herein can be extended to other scenarios and/or other types of wireless communications systems. Also, while these embodiments are described separately, they may be used separately or together in any desired combination.

Certain embodiments may provide one or more of the following technical advantage(s). For example, embodiments disclosed herein allow certain types of UEs and/or IAB nodes to perform initial access to a cell.

Figure 3:
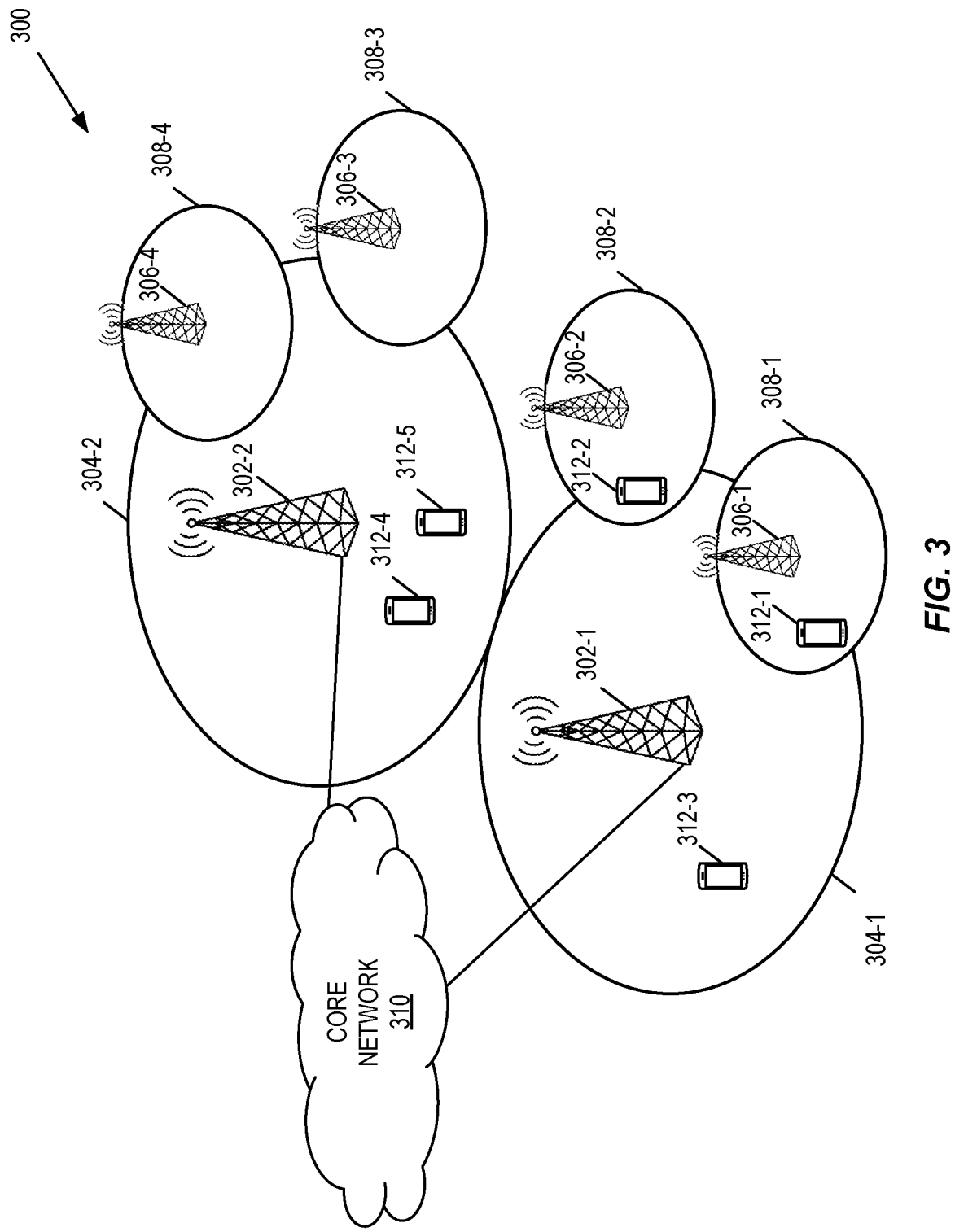
FIG. 3 illustrates one example of a cellular communications system in which embodiments of the present disclosure may be implemented.

FIG. 3 illustrates one example of a cellular communications network 300 in which embodiments of the present disclosure may be implemented. In the embodiments described herein, the cellular communications system 300 is a 5GS. In this example, the cellular communications system 300 includes base stations 302-1 and 302-2, which in the 5GS can be NR base stations (referred to as gNBs) or next generation eNBs (ng-eNBs) (i.e., LTE RAN nodes connected to the 5GS), controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

In this example, at least some of the base stations 302 and/or at least some of the low power nodes 306 are IAB nodes that operate in accordance with any of the variations of Embodiments 1, 2, and 3 described below.

Embodiment 1

In a first set of embodiments, the Release 15 SSB format, time domain burst mapping, and Master Information Block (MIB) are used. When ssb-SubCarrierOffset>11 is set, a Release 15 UE does not proceed finding System Information Block 1 (SIB1). The network configures ssb-SubCarrierOffset={12, 13, 14, 15} to indicate to a Release 15 UE that no SIB1 is present. For an IAB node, it is specified that these ssb-SubCarrierOffset values are valid and map to the ssb-SubCarrierOffset values 0-11 in a specified way (e.g., in a way defined by a 3GPP standard). All mappings that are possible to be defined are possible and embodiment 1f (described below) gives one possible example. Further, when an IAB node reads ssb-SubCarrierOffset set to one of these values (e.g., one of the values {12, 13, 14, 15}), the IAB node proceeds to find SIB1 in accordance with the respective ssb-SubCarrierOffset value in the range of 0-11 to which that value is mapped. For example, if the IAB nodes read ssb-SubCarrierOffset set to a value of 12 and the value of 12 is mapped to the ssb-SubCarrierOffset value of 0, then the IAB node proceeds to find SIB1 in accordance with ssb-SubCarrierOffset value of 0.

Note that while in the example above the ssb-SubCarrierOffset={12, 13, 14, 15} are all mapped to respective ssb-SubCarrierOffset values in the range of 0-11 in a specified way, the present disclosure is not limited thereto. For example, any one or more of the ssb-SubCarrierOffset values 12, 13, 14, and 15 may be mapped to respective ssb-SubCarrierOffset values in range of 0-11. As one specific example, the ssb-SubCarrierOffset values 12 and 13 may be mapped to ssb-SubCarrierOffsetvalues 0 and 1 and the ssb-SubCarrierOffset values 14 and 15 are not mapped. Thus, in this specific example, if the IAB node reads ssb-SubCarrierOffset set to a value of 12, then the IAB node proceeds to find SIB1 in accordance with ssb-SubCarrierOffset value of 0. Similarly, if the IAB node reads ssb-SubCarrierOffset set to a value of 13, then the IAB node proceeds to find SIB1 in accordance with ssb-SubCarrierOffset value of 1. However, if the IAB node reads ssb-SubCarrierOffset set to a value of 14 or 15, then the IAB node takes some other action (e.g., refrains from attempting to find SIB1).

In an embodiment 1a, the SIB1 is an IAB-SIB1 with only information needed by the IAB node for initial access.

In an embodiment 1b, the SIB1 is a Release 15 SIB1 that is extended to carry additional IAB specific system information.

In an embodiment 1c, one of the codepoints 12, 13, 14, or 15 is used to indicate for an IAB node that SIB1/IAB-SIB1 is not present and the rest of the values indicate a subcarrier offset in a predefined way. One example is given in embodiment 1g below.

In an embodiment 1d, when the SSB is on Frequency Range 1 (FR1), there is only one subcarrier spacing possible for SSB; thus, subCarrierSpacingCommon can be used together with the codepoints 12, 13, 14, and 15 of ssb-SubCarrierOffset to tell the IAB node the subcarrier offset to be used to find SIB1.

In an embodiment 1e, the reserved bits in MIB are used to indicate that this SSB is targeted only to the IAB nodes or the UEs.

In this scenario (when ssb-SubCarrierOffset>11/23) (e.g., >11 normally or >23 for FR1), only a limited set of offsets between SSB and Control Resource Set 0 (CORESET0) are valid.

In an embodiment 1f, only four frequency offsets are used, for example a shift of 0, 1, 2, or 3 subcarriers. These offsets are then indicated by the four remaining values for ssb-SubCarrierOffset such as, for example, ssb-SubCarrierOffset={12, 13, 14, 15} indicates frequency offset={0, 1, 2, 3} in case of IAB nodes.

In an embodiment 1g, only three frequency offsets are used, for example a shift of 0, 1, or 2 subcarriers. These offsets are then indicated by three of the remaining four values for ssb-SubCarrierOffset such as, for example, ssb-SubCarrierOffset={12, 13, 14} indicates frequency offset={0, 1, 2} in the case of IAB nodes. The remaining value (15 in this example) can then indicate no SIB1 for IAB nodes.

Note that, in case of FR1, the ssb-SubCarrierOffset can be extended with one extra bit. Thus, in all of the embodiments described above, the ssb-SubCarrierOffset used by the IAB node are >11 in the case on non-FR1 and >23 in the case of FR1 (and each of the embodiments can be modified accordingly).

Figure 4:
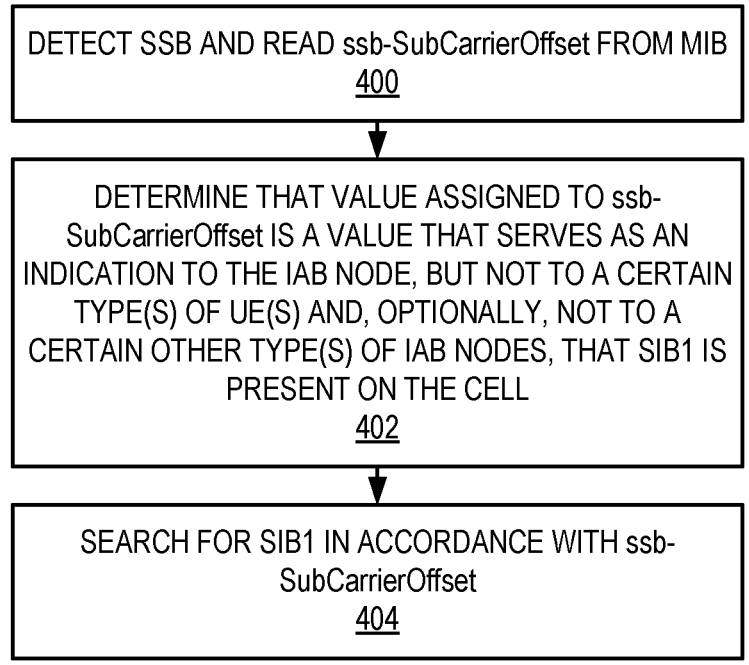
FIG. 4 is a flow chart that illustrates the operation of an IAB node to perform an initial cell access procedure in accordance with some aspects of one embodiment of the present disclosure.

FIG. 4 is a flow chart that illustrates the operation of an IAB node (e.g., a radio access node such as, e.g., a base station that is an IAB node) to perform an initial cell access procedure in accordance with some aspects of Embodiment 1 described above. As illustrated, the IAB node detects an SSB and reads, from the SSB, system information (MIB) comprising an ssb-SubCarrierOffset value (step 400). As discussed above, the parameter ssb-SubCarrierOffset has a defined set of possible values, where a subset of the possible values serves as indications of different frequency offsets between the SSB carrying the system information and the Common Resource Block (CRB) grid. More specifically:

For non-FR1, the set of possible values is {0, 1, 2, ... , 15}, where:
values in a first subset {0, 1, 2, ... , 11} serve as indications of different frequency offsets between the SSB carrying the MIB and the CRB grid; and
values in a second subset {12, 13, 14, 15} are interpreted differently by different types of nodes, namely:
for a certain type(s) of UE(s) (e.g., Release 15 UEs) and possibly for certain type(s) of IAB(s), values in the subset {12, 13, 14, 15} are interpreted as indications that the cell does not provide SIB1 and hence no CORESET #0 is configured in MIB; and
for IABs (or certain type(s) of IAB(s)), one or more of the values in the subset {12, 13, 14, 15} serve as an indication that the cell does provide SIB1 and, in some embodiments, are mapped to one or more respective values in the subset {0, 1, 2, ... , 11} to thereby serve as an indication of a frequency offset between the SSB carrying the MIB and the CRB grid; and For FR1, the set of possible values is {0, 1, 2, ... , 31}, where:
values in a first subset {0, 1, 2, ... , 23} serve as indications of different frequency offsets between the SSB carrying the MIB and the CRB grid; and
values in a second subset {24, 25, ... , 31} are interpreted differently by different types of nodes, namely:
for a certain type(s) of UE(s) (e.g., Release 15 UEs) and possibly for certain type(s) of IAB(s), values in the subset {24, 25, ... , 31} are interpreted as indications that the cell does not provide SIB1 and hence no CORESET #0 is configured in MIB; and
for IABs (or certain type(s) of IAB(s)), one or more of the values in the subset {24, 25, ... , 31} serve as an indication that the cell does provide SIB1 and, in some embodiments, are mapped to one or more respective values in the subset {0, 1, 2, ... , 23} to thereby serve as an indication of a frequency offset between the SSB carrying the MIB and the CRB grid.

The IAB node determines that the value of ssb-SubCarrierOffset is one of the values in the second subset of possible values of ssb-SubCarrierOffset (step 402). Based on this determination, the IAB node proceeds to search for SIB1 (step 404). For example, in some embodiments, the value of ssb-SubCarrierOffset is mapped to one of the values in the first subset and thereby serves, to the IAB node, as an indication of a frequency offset between the SSB carrying the MIB and the CRB grid. The IAB node can then use this indicated frequency offset along with the value of the parameter pdcch-ConfigSIB1 to search for SIB1.

Embodiment 2

A separate or complementary synchronization raster for IAB nodes is defined which is off the synchronization raster of Release 15. SSBs on this separate or complementary raster can apply to Embodiment 1.

In some embodiments, the separate or complementary raster is a separate sync raster for IAB nodes, and the IAB node searches for SSB only on this sync raster.

In some other embodiments, the separate or complementary raster is a complementary sync raster for IAB nodes, and the IAB node searches for SSB both on the currently defined sync raster (the Release 15 sync raster) and on the complementary sync raster.

Embodiment 3

Phy Option:
SSB beam mapping is different in PHY. It can be a different SS burst for UE and IAB nodes, or one has first L UE SSB beams and then after them there are additional IAB SSB beams.
The IAB SSBs can carry IAB MIB and IAB SIB1 which a Release 15 UE would not even be able to decode.
In some embodiments, a new IAB SSB format is used. For example, the new IAB SSB format may include different Primary Synchronization Signal (PSS), and/or Secondary Synchronization Signal (SSS), and/or Demodulation Reference Sequence (DMRS), which can only be decoded by an IAB node.

Figure 5:
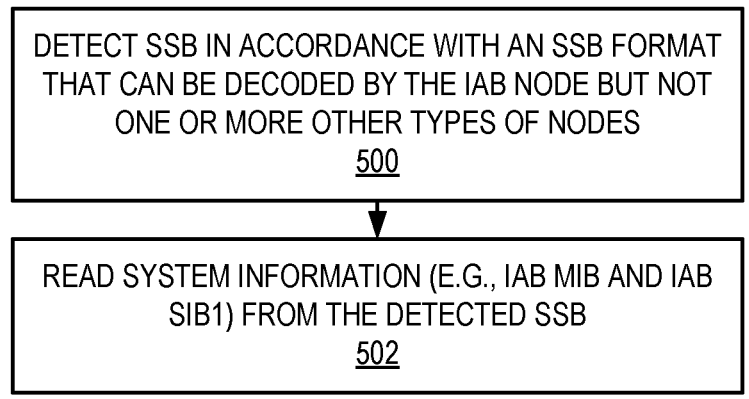
FIG. 5 is a flow chart that illustrates the operation of an IAB node to perform an initial cell access procedure in accordance with some aspects of one embodiment of the present disclosure.

FIG. 5 is a flow chart that illustrates the operation of an IAB node in accordance with one example of Embodiment 3. As illustrated, the IAB node detects an SSB of a cell in accordance with an SSB format that can be decoded by the IAB node but not one or more other types of nodes (step 500). The IAB node reads system information from the detected SSB (step 502). As described above, the system information may include IAB MIB and IAB SIB1. The IAB node then utilizes the system information to complete initial access, as will be appreciated by one of ordinary skill in the art. In one embodiment, the one or more other types of nodes comprise one or more types of UEs. In some embodiments, the one or more types of UEs comprise Release 15 UEs.

Figure 6:
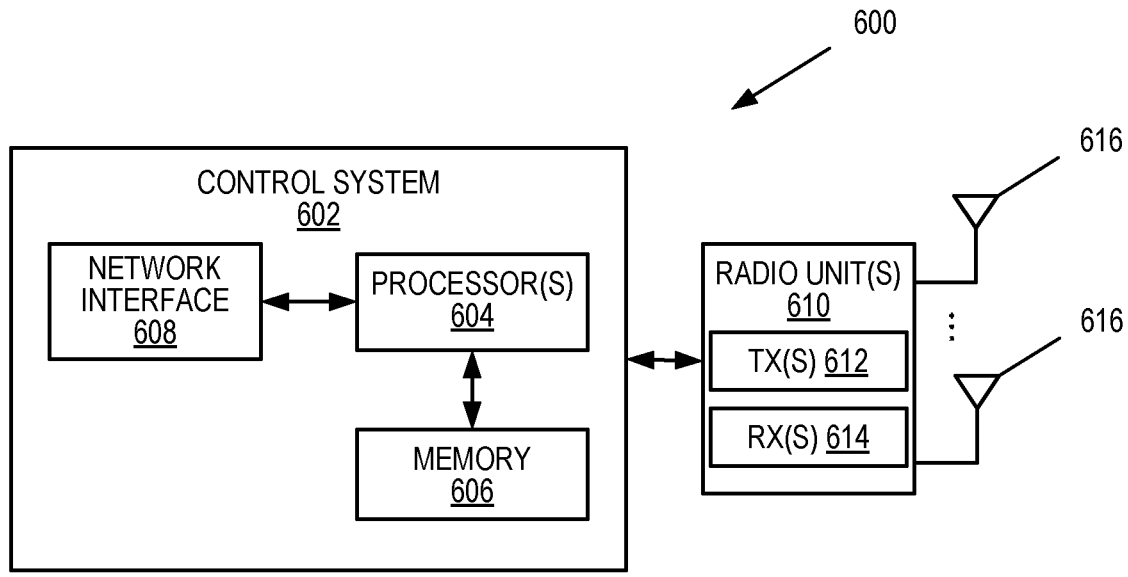
FIGS. 6 through 8 are schematic block diagrams of example embodiments of an IAB node.

FIG. 6 is a schematic block diagram of a radio access node 600 according to some embodiments of the present disclosure. In one example, the radio access node 600 is an IAB node that operates according to any of the embodiments described herein (e.g., any of Embodiments 1, 2, and 3 described above). The radio access node 600 may be, for example, a base station 302 or 306. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 includes one or more radio units 610 that each includes one or more transmitters 612 and one or more receivers 614 coupled to one or more antennas 616. In relation to being an IAB node with both a wireless backhaul link (e.g., to another IAB node such as a donor IAB node) and a wireless access link (e.g., to a wireless communication device such as, e.g., a UE), the radio access node 600 may include, for example, one or more radio units 610 for wireless backhaul and one or more radio units for wireless access or may include a common radio unit(s) for both wireless backhaul and wireless access, as will be appreciated by one of ordinary skill in the art. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein (e.g., one or more functions of an IAB node as described herein). In some embodiments, the function(s) are implemented in software that is stored, e.g., in the memory 606 and executed by the one or more processors 604.

Figure 7:
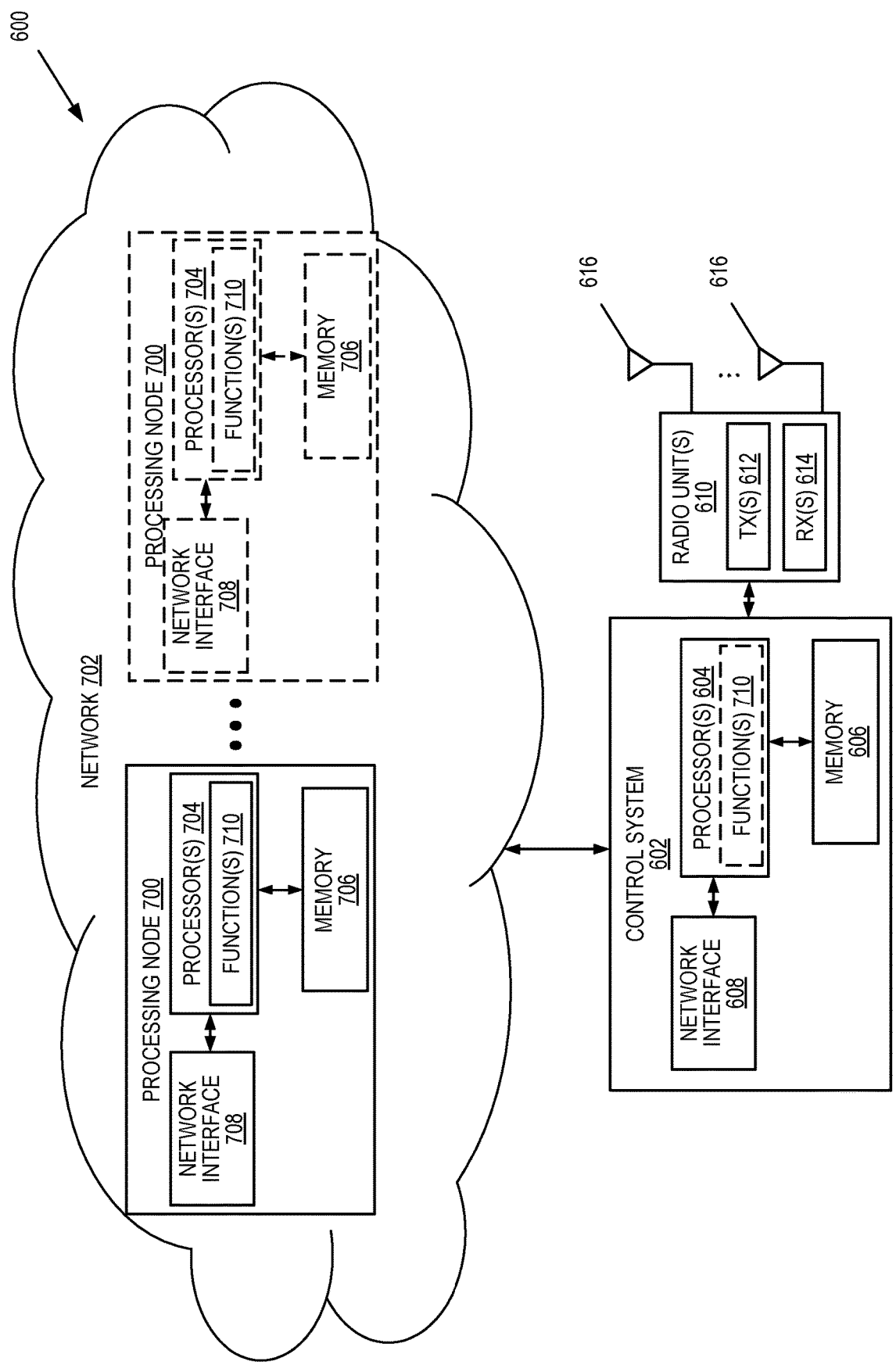

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures. Again, in one example, the radio access node 600 is an IAB node that operates according to any of the embodiments described herein (e.g., any of Embodiments 1, 2, and 3 described above).

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 described herein (e.g., functions of an IAB node as described herein) are implemented at the one or more processing nodes 700 or distributed across the control system 602 and the one or more processing nodes 700 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 (e.g., functionality of an IAB node) or a node (e.g., a processing node 700) implementing one or more of the functions 710 of the radio access node 600 (e.g., implanting one or more of the functions of an IAB node) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
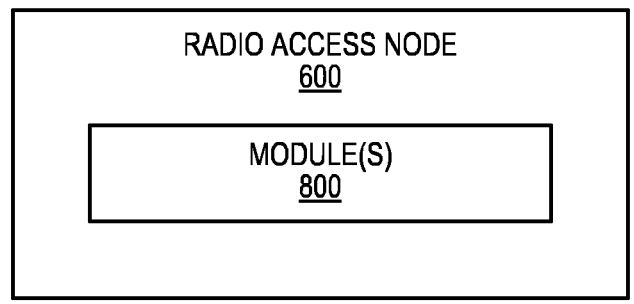

FIG. 8 is a schematic block diagram of the radio access node 600 according to some other embodiments of the present disclosure. Again, in one example, the radio access node 600 is an IAB node. The radio access node 600 includes one or more modules 800, each of which is implemented in software. The module(s) 800 provide the functionality of the radio access node 600 described herein (e.g., the functionality of an IAB node as described herein). This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1

A method performed by an Integrated Access and Backhaul, IAB, node to perform initial cell access in a cellular communications network, the method comprising: detecting (400) a Synchronization Signal/Physical Broadcast Channel Block, SSB, of a cell; reading (400), from the SSB, system information comprising a value of a parameter; determining (402) that the value of the parameter is a predefined value that serves as an indication to IAB nodes that additional system information is present on the cell, wherein the predefined value of the parameter serves as an indication to one or more other types of nodes that additional system information is not present on the cell; and searching (404) for the additional system information in accordance with the value of the parameter.

Embodiment 2

The method of embodiment 1 wherein the value of the predefined value also serves, to IAB nodes, as an indication of a frequency domain offset between the detected SSB and a defined resource block grid of the cell.

Embodiment 3

The method of embodiment 1 or 2 wherein the predefined value of the parameter serves as an indication that additional system information is not present on the cell to User Equipments, UEs, or one or more certain types of UEs.

Embodiment 4

The method of embodiment 3 wherein: the parameter has a predefined set of possible values; values in a first subset of the predefined set of possible values of the parameter serve, to the one or more certain types of UEs, as indications of different frequency offsets between the detected SSB and the defined resource block grid of the cell; values in a second subset of the predefined set of possible values of the parameter serve, to the one or more certain types of UEs, as indications that additional system information is not present on the cell, the first subset and the second subset being disjoint subsets of the predefined set of possible values; and the predefined value of the parameter that serves as an indication to IAB nodes that the additional system information is present on the cell is one of the values in the second subset of the predefined set of possible values of the parameter.

Embodiment 5

The method of embodiment 4 wherein the predefined value of the parameter is mapped to a respective one of the values in the first subset of the predefined set of possible values of the parameter such that the predefined value of the parameter also serves, to IAB nodes, as an indication that a frequency domain offset between the detected SSB and a defined resource block grid is a frequency offset indicated by the respective one of the values in the first subset of the predefined set of possible values of the parameter to which the predefined value is mapped.

Embodiment 6

The method of embodiment 5 wherein: all of the values in the second subset of the predefined set of possible values of the parameter serve as indications, to IAB nodes, that the additional system information is present on the cell; and each value in the second subset of the predefined set of possible values of the parameter is mapped to a different value in the first subset of the predefined set of possible values of the parameter.

Embodiment 7

The method of embodiment 5 wherein: one or more, but not all, of the values in the second subset of the predefined set of possible values of the parameter serve as indications, to IAB nodes, that the additional system information is present on the cell; and each value of the one or more of the values in the second subset of the predefined set of possible values of the parameter that serve as indications, to IAB nodes, that the additional system information is present on the cell is mapped to a different value in the first subset of the predefined set of possible values of the parameter.

Embodiment 8

The method of embodiment 4 wherein one or more, but not all, of the values in the second subset of the predefined set of possible values of the parameter serve as indications, to IAB nodes, that the additional system information is present on the cell.

Embodiment 9

The method embodiment 7 or 8 wherein one of the values in the second subset of the predefined set of possible values of the parameter serves as an indication, to IAB nodes, that the additional system information is not present on the cell.

Embodiment 10

The method of embodiment 4 wherein all of the values in the second subset of the predefined set of possible values of the parameter serve as indications, to IAB nodes, that the additional system information is present on the cell.

Embodiment 11

The method of any one of embodiments 4 to 10 wherein: the cellular communications network is a Third Generation Partnership Project, 3GPP, New Radio, NR, network; the parameter is ssb-SubCarrierOffset; the first subset of the predefined set of possible values for the parameter is {0, 1, 2, . . . , 11}; and the second subset of the predefined set of possible values for the parameter is {11, 12, 13, 14, 15}.

Embodiment 12

The method of any one of embodiments 4 to 10 wherein: the cellular communications network is a Third Generation Partnership Project, 3GPP, New Radio, NR, network; the parameter is ssb-SubCarrierOffset; the first subset of the predefined set of possible values for the parameter is {0, 1, 2, . . . , 23}; and the second subset of the predefined set of possible values for the parameter is {24, 25, 26, . . . , 31}.

Embodiment 13

The method of any one of embodiments 1 to 10 wherein the cellular communications network is a Third Generation Partnership Project, 3GPP, New Radio, NR, network, and the parameter is ssb-SubCarrierOffset.

Embodiment 14

The method of any one of embodiments 1 to 13 wherein the system information is a master information block, and the additional system information is an IAB secondary information block within only information needed by the IAB node for initial access.

Embodiment 15

The method of any one of embodiments 1 to 13 wherein the system information is a master information block, and the additional system information is an existing secondary information block that is extended to carry additional IAB-specific system information.

Embodiment 16

The method of any one of embodiments 2 to 15 wherein the one or more certain types of UEs comprise Release 15 UEs.

Embodiment 17

The method of any one of embodiments 2 to 16 wherein a synchronization raster utilized by the IAB node is separate from or complementary to a synchronization raster utilized by the one or more certain types of UEs.

Embodiment 18

A method performed by an Integrated Access and Backhaul, IAB, node to perform initial cell access in a cellular communications network, the method comprising: detecting a Synchronization Signal/Physical Broadcast Channel Block, SSB, of a cell in accordance with a SSB format that can be decoded by the IAB node but not one or more other types of nodes; and reading system information from the detected SSB.

Embodiment 19

The method of embodiment 18 wherein the one or more other types of nodes comprise one or more types of User Equipments, UEs.

Embodiment 20

The method of embodiment 19 wherein the one or more types of UEs comprise Release 15 UEs.

Embodiment 21

An Integrated Access and Backhaul, IAB, node for performing initial cell access in a cellular communications network, the IAB node adapted to perform the method of any one of embodiments 1 to 20.

Embodiment 22

An Integrated Access and Backhaul, IAB, node for performing initial cell access in a cellular communications network, the IAB node comprising: one or more transmitters and one or more receivers; and processing circuitry associated with the one or more transmitters and the one or more receivers, the processing circuitry configured to cause the IAB node to perform the method of any one of embodiments 1 to 20.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    4G Fourth Generation
    5G Fifth Generation
    5GS Fifth Generation System
    ASIC Application Specific Integrated Circuit
    CD Cell-Defining
    CORESET Control Resource Set
    CPU Central Processing Unit
    CRB Common Resource Block
    DMRS Demodulation Reference Sequence
    DSP Digital Signal Processor
    eNB Enhanced or Evolved Node B
    FPGA Field Programmable Gate Array
    FR Frequency Range
    GHz Gigahertz
    gNB New Radio Base Station
    IAB Integrated Access and Backhaul
    LTE Long Term Evolution
    MIB Master Information Block
    MME Mobility Management Entity
    ms Millisecond
    MTC Machine Type Communication
    ng-eNB Next Generation Enhanced or Evolved Node B
    NR New Radio
    NSA Non-Stand-Alone
    OFDM Orthogonal Frequency Division Multiplexing
    PBCH Physical Broadcast Channel
    PCI Physical Cell Identity
    PDCCH Physical Downlink Control Channel
    PDSCH Physical Downlink Shared Channel
    P-GW Packet Data Network Gateway
    PSS Primary Synchronization Signal
    RAM Random Access Memory
    RAN Radio Access Network ROM Read Only Memory
RRH Remote Radio Head
SA Stand-Alone
SCEF Service Capability Exposure Function
SIB System Information Block
SS Synchronization Signal
SSB Synchronization Signal/Physical Broadcast Channel Block
SSS Secondary Synchronization Signal
TS Technical Specification
UE User Equipment Those skilled in the art will recognize improvements and modifications to the embodiments of the present disclosure. All such improvements and modifications are considered within the scope of the concepts disclosed herein.

What is claimed is:

1. A method performed by an Integrated Access and Backhaul, IAB, node to perform initial cell access in a cellular communications network, the method comprising:
    detecting a Synchronization Signal/Physical Broadcast Channel Block, SSB, of a cell;
    reading, from the SSB, system information comprising a value of a parameter;
    determining that the value of the parameter is a predefined value that serves as an indication to IAB nodes that additional system information is present on the cell, wherein the predefined value of the parameter serves as an indication to User Equipments, UEs, or one or more certain types of UEs that additional system information is not present on the cell, the parameter having a predefined set of possible values; and
    searching for the additional system information in accordance with the value of the parameter;
    wherein:
    values in a first subset of the predefined set of possible values of the parameter serve, to the one or more certain types of UEs, as indications of different frequency offsets between the detected SSB and the defined resource block grid of the cell;
    values in a second subset of the predefined set of possible values of the parameter serve, to the one or more certain types of UEs, as indications that additional system information is not present on the cell, the first subset and the second subset being disjoint subsets of the predefined set of possible values; and
    the predefined value of the parameter that serves as an indication to IAB nodes that the additional system information is present on the cell is one of the values in the second subset of the predefined set of possible values of the parameter.

2. The method of claim 1 wherein the predefined value of the parameter serves as an indication to one or more other types of nodes that additional system information is not present on the cell.

3. The method of claim 2 wherein the one or more certain types of UEs comprise Release 15 UEs.

4. The method of claim 2 wherein a synchronization raster utilized by the IAB node is separate from or complementary to a synchronization raster utilized by the one or more certain types of UEs.

5. The method of claim 1 wherein the value of the predefined value also serves, to IAB nodes, as an indication of a frequency domain offset between the detected SSB and a defined resource block grid of the cell.

6. The method of claim 1 wherein the predefined value of the parameter is mapped to a respective one of the values in the first subset of the predefined set of possible values of the parameter such that the predefined value of the parameter also serves, to IAB nodes, as an indication that a frequency domain offset between the detected SSB and a defined resource block grid is a frequency offset indicated by the respective one of the values in the first subset of the predefined set of possible values of the parameter to which the predefined value is mapped.

7. The method of claim 6 wherein:
    all of the values in the second subset of the predefined set of possible values of the parameter serve as indications, to IAB nodes, that the additional system information is present on the cell; and
    each value in the second subset of the predefined set of possible values of the parameter is mapped to a different value in the first subset of the predefined set of possible values of the parameter.

8. The method of claim 6 wherein:
    one or more, but not all, of the values in the second subset of the predefined set of possible values of the parameter serve as indications, to IAB nodes, that the additional system information is present on the cell; and
    each value of the one or more of the values in the second subset of the predefined set of possible values of the parameter that serve as indications, to IAB nodes, that the additional system information is present on the cell is mapped to a different value in the first subset of the predefined set of possible values of the parameter.

9. The method claim 8 wherein one of the values in the second subset of the predefined set of possible values of the parameter serves as an indication, to IAB nodes, that the additional system information is not present on the cell.

10. The method of claim 1 wherein one or more, but not all, of the values in the second subset of the predefined set of possible values of the parameter serve as indications, to IAB nodes, that the additional system information is present on the cell.

11. The method of claim 1 wherein all of the values in the second subset of the predefined set of possible values of the parameter serve as indications, to IAB nodes, that the additional system information is present on the cell.

12. The method of claim 1 wherein the system information is a master information block, and one or more reserved bits in the master information block are used to indicate that the additional system information is targeted only to IAB nodes.

13. The method of claim 1 wherein the system information is a master information block, and the additional system information is an IAB secondary information block within only information needed by the IAB node for initial access.

14. The method of claim 1 wherein the system information is a master information block, and the additional system information is an existing secondary information block that is extended to carry additional IAB-specific system information.

15. An Integrated Access and Backhaul, IAB, node for performing initial cell access in a cellular communications network, the IAB node adapted to:
    detect a Synchronization Signal/Physical Broadcast Channel Block, SSB, of a cell;
    read, from the SSB, system information comprising a value of a parameter;
    determine that the value of the parameter is a predefined value that serves as an indication to IAB nodes that additional system information is present on the cell, wherein the predefined value of the parameter serves as an indication to User Equipments, UEs, or one or more certain types of UEs that additional system information is not present on the cell, the parameter having a predefined set of possible values; and search for the additional system information in accordance with the value of the parameter;

wherein:

values in a first subset of the predefined set of possible values of the parameter serve, to the one or more certain types of UEs, as indications of different frequency offsets between the detected SSB and the defined resource block grid of the cell;

values in a second subset of the predefined set of possible values of the parameter serve, to the one or more certain types of UEs, as indications that additional system information is not present on the cell, the first subset and the second subset being disjoint subsets of the predefined set of possible values; and the predefined value of the parameter that serves as an indication to IAB nodes that the additional system information is present on the cell is one of the values in the second subset of the predefined set of possible values of the parameter.

16. The IAB node of claim 15 wherein the IAB node comprises:

one or more transmitters and one or more receivers; and processing circuitry associated with the one or more transmitters and the one or more receivers, the processing circuitry configured to cause the IAB node to:

detect the SSB of the cell;

read, from the SSB, the system information comprising the value of the parameter;

determine that the value of the parameter is the predefined value that serves as an indication to IAB nodes that additional system information is present on the cell; and search for the additional system information in accordance with the value of the parameter.

* * * * *